(12) United States Patent
Johnson et al.

(10) Patent No.: US 10,534,603 B1
(45) Date of Patent: Jan. 14, 2020

(54) AUTOMATIC RENAMING OF ELEMENTS OF A GRAPHICAL MODELING ENVIRONMENT

(71) Applicant: The MathWorks, Inc., Natick, MA (US)

(72) Inventors: Ivan Joseph Johnson, Newton, MA (US); Paul Jackson, Southborough, MA (US)

(73) Assignee: The MathWorks, Inc., Natick, MA (US)

( * ) Notice: Subject to any disclaimer, the term of this patent is extended or adjusted under 35 U.S.C. 154(b) by 317 days.

(21) Appl. No.: 14/551,245

(22) Filed: Nov. 24, 2014

(51) Int. Cl.
*G06F 8/72* (2018.01)
*G06F 3/0482* (2013.01)
*G06F 16/245* (2019.01)

(52) U.S. Cl.
CPC .............. *G06F 8/72* (2013.01); *G06F 3/0482* (2013.01); *G06F 16/245* (2019.01)

(58) Field of Classification Search
CPC ..... G06F 8/72; G06F 3/0482; G06F 17/30424
See application file for complete search history.

(56) References Cited

U.S. PATENT DOCUMENTS

| | | | | |
|---|---|---|---|---|
| 6,064,812 A * | 5/2000 | Parthasarathy | .... | G05B 19/0426 717/105 |
| 6,064,816 A * | 5/2000 | Parthasarathy | .... | G05B 19/0426 703/21 |
| 6,604,196 B1 * | 8/2003 | Monday | ........... | G06F 9/465 713/100 |
| 6,868,526 B2 * | 3/2005 | Singh | ........... | G06F 8/34 345/619 |
| 7,542,892 B1 * | 6/2009 | Clark | ........... | G06F 17/5031 703/19 |
| 7,742,903 B2 * | 6/2010 | Ciolfi | ........... | G06F 17/5009 703/6 |
| 8,280,832 B1 * | 10/2012 | Englehart | ........... | G06F 17/50 706/45 |
| 8,626,481 B1 * | 1/2014 | Sundararajan | ........ | G06F 17/5022 703/13 |
| 9,588,744 B2 * | 3/2017 | Bienkowski | ........... | G06F 8/34 |

(Continued)

OTHER PUBLICATIONS

Khalusova, Maria. "Type Migration Refactoring." IntelliJ Idea Blog, JetBrains S.r.o., Jun. 11, 2008, blog.jetbrains.com/idea/2008/06/type-migration-refactoring/.*

(Continued)

*Primary Examiner* — Justin R. Blaufeld
(74) *Attorney, Agent, or Firm* — Young Basile Hanlon & MacFarlane, P.C.

(57) ABSTRACT

A device may receive input to perform a renaming operation in a graphical modeling environment. The device may identify a selected element, included in the graphical modeling environment, based on the input. The device may determine an element indicator associated with the selected element. The element indicator may be used to identify a relationship between the selected element and a related element included in the graphical modeling environment. The device may identify, based on the element indicator, the related element associated with the selected element. The device may modify the element indicator based on receiving the input to perform the renaming operation, and may modify a corresponding element indicator corresponding to the related element.

25 Claims, 15 Drawing Sheets

(56) References Cited

U.S. PATENT DOCUMENTS

| | | | | |
|---|---|---|---|---|
| 2003/0016246 A1* | 1/2003 | Singh | G06F 8/34 | 715/763 |
| 2004/0103404 A1* | 5/2004 | Naumovich | G06F 9/4492 | 717/136 |
| 2006/0053168 A1* | 3/2006 | McDougall | G06F 17/248 | |
| 2007/0132779 A1* | 6/2007 | Gilbert | H04L 67/12 | 345/619 |
| 2007/0271499 A1* | 11/2007 | Feng | G06F 17/5009 | 715/209 |
| 2009/0037873 A1* | 2/2009 | Ahadian | G06F 8/33 | 717/105 |
| 2009/0100405 A1* | 4/2009 | Belenky | G06F 8/10 | 717/104 |
| 2009/0327994 A1* | 12/2009 | Christensen | G06F 8/10 | 717/106 |
| 2010/0153940 A1* | 6/2010 | Remmel | G06F 8/72 | 717/168 |
| 2011/0219352 A1* | 9/2011 | Majumder | G06F 17/50 | 716/139 |
| 2012/0167040 A1* | 6/2012 | Davies | G06F 8/71 | 717/110 |
| 2013/0085991 A1* | 4/2013 | Welden | G06F 16/213 | 707/634 |
| 2014/0013205 A1* | 1/2014 | Mikhaiel | G06F 17/2247 | 715/234 |
| 2014/0289700 A1* | 9/2014 | Srinivasaraghavan | G06F 8/34 | 717/106 |

OTHER PUBLICATIONS

TIP, Frank et al. "Refactoring Using Type Constraints." ACM Transactions on Programming Languages and Systems, vol. 33, No. 3, 2011, pp. 1-47. ACM Digital Library.*

The MathWorks, Inc., "Using Simulink® Version 6". Sep. 2005.*

* cited by examiner

| Selected Entity Type | Rule to Identify Related Entities | Renaming Operation |
|---|---|---|
| Goto block | Identify From block that receives information from Goto block | Rename references to Goto block |
| Data store | Identify elements that read data from or write data to data store | Rename references to data store element |
| Variable | Search for elements that reference the variable | Rename variable |
| ... | ... | ... |

560

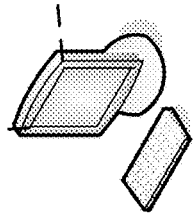

Client Device
210

FIG. 5C

AUTOMATIC RENAMING OF ELEMENTS OF A GRAPHICAL MODELING ENVIRONMENT

BRIEF DESCRIPTION OF THE DRAWINGS

FIGS. 5A-5D are diagrams of another example implementation of automatic renaming of elements of a graphical modeling environment;

DETAILED DESCRIPTION

The following detailed description of example implementations refers to the accompanying drawings. The same reference numbers in different drawings may identify the same or similar elements.

A graphical modeling environment may include various elements, such as entities (e.g., graphical entities, such as blocks in a block diagram model, a state machine model, or the like), relationships between entities (e.g., signals), ports for inputting information to or outputting information from an entity, attributes associated with an entity or a relationship, or the like. An element may be associated with a name that identifies the element in the graphical modeling environment. In some situations, a user may wish to rename an element, such as to provide a more meaningful name, to avoid duplicate names, to avoid confusing names, or the like. However, such renaming may cause errors when dependent elements, that depend on the renamed element, still include a reference to the old name (e.g., when the dependent elements are not updated to reference the new name of the renamed element). Furthermore, manual renaming of dependent elements may be slow and error prone. Implementations described herein assist in automatic renaming of dependent elements in a graphical modeling environment, which may increase the accuracy and the efficiency of the renaming process.

Figure 1:
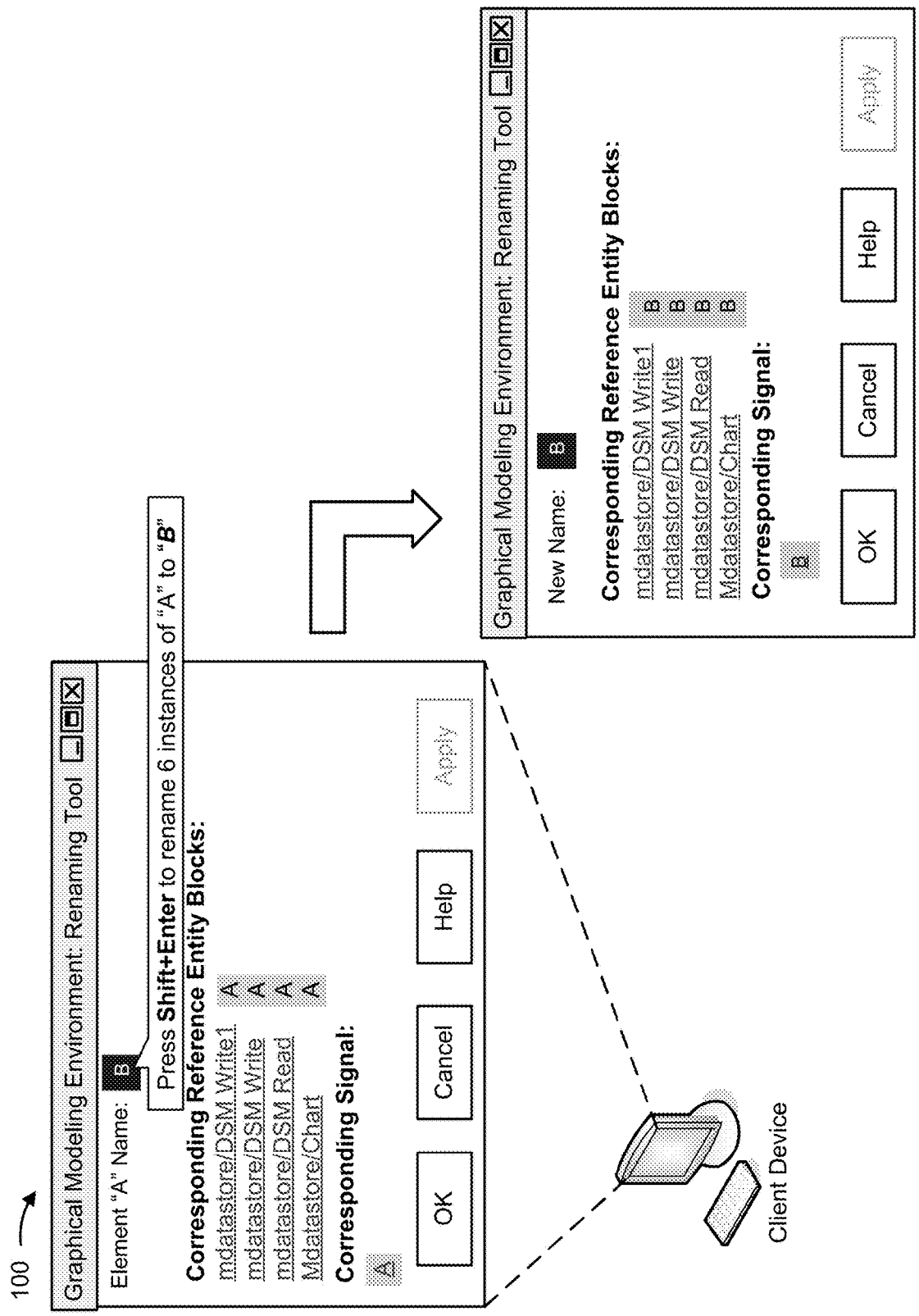
FIG. 1 is a diagram of an overview of an example implementation described herein.

FIG. 1 is a diagram of an overview of an example implementation 100 described herein. As shown in FIG. 1, a graphical modeling environment may execute on a client device, such as a desktop computer, a laptop computer, or the like. The graphical modeling environment may include a renaming tool that assists a user with renaming elements included in the graphical modeling environment. For example, assume that a selected element is named "A," as shown. Further, assume that the selected element is associated with five related elements, shown as four reference entity elements and a signal element. Assume that the user wishes to rename the selected element from "A" to "B."

As further shown in FIG. 1, the user inputs the new name, "B," via the renaming tool. The renaming tool also provides an input mechanism to permit the user to propagate the new name to related elements (e.g., semantically related elements). In example implementation 100, the input mechanism is shown as keyboard input of Shift+Enter. This particular renaming tool and input mechanism are provided as an example, and the client device may provide another tool and/or mechanism to trigger a renaming operation, as described in more detail elsewhere herein. As further shown, based on the user input (e.g., pressing Shift+Enter), the client device updates the related elements based on the new name of the selected element. This may include, for example, renaming a related element, renaming a reference to the selected element from the related element, or the like. In this way, related elements in a graphical modeling environment may be updated quickly and accurately based on a renamed selected element.

Figure 2:
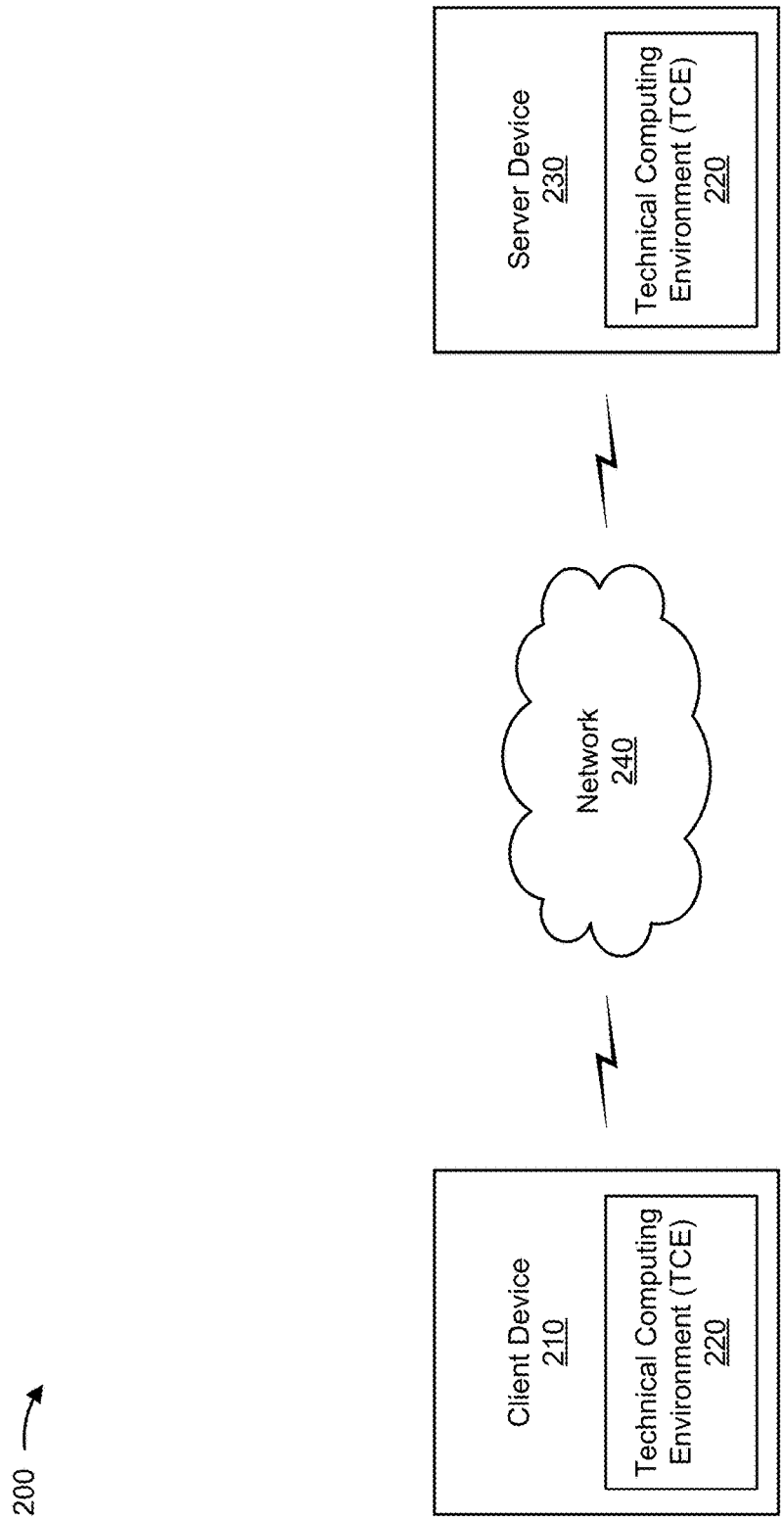
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing a graphical modeling environment and/or information associated with a graphical modeling environment (e.g., information associated with elements included in the graphical modeling environment). For example, client device 210 may include a computing device, such as a desktop computer, a laptop computer, a tablet computer, a mobile phone (e.g., a smart phone, a radiotelephone, etc.), or a similar type of device. Client device 210 may receive an indication (e.g., based on user input) to rename a selected element included in a graphical modeling environment, and may perform a renaming operation to rename related elements associated with the selected element. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may be implemented as a text-based environment (e.g., MATLAB® software by The MathWorks, Inc.; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.) and/or a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments.

TCE 220 may include a graphical modeling environment. In some implementations, a graphical modeling environment may include a block diagram environment for modeling, simulating, and/or executing a system using a block diagram, for automatically generating code for simulating the system, for testing or verifying the system, or the like. Additionally, or alternatively, a graphical modeling environment may include a state machine environment for modeling, simulating, and/or executing decision logic using a state machine, a flow chart, or the like. The graphical modeling environment may be associated with one or more elements (e.g., entities, such as graphical entities, textual entities, programming objects; relationships between entities; ports associated with entities; attributes of entities; etc.), as described in more detail elsewhere herein. In some implementations, the elements may be executable.

For example, TCE 220 may include a modeling environment that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

The system represented by a model may have various execution semantics that may be represented in the model as a collection of modeling entities, sometimes referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include, for example, blocks and/or ports. The relationships may include for example, lines (e.g., connector lines) and/or references (e.g., textual labels). The attributes may include, for example, value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., X=2Y) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations X=2Y+U and Y=3X−2U may be symbolically processed into one equation 5Y=−U. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally specific or consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. In some implementations, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

In some implementations, the graphical modeling environment may include one or more models. When the graphical modeling environment includes multiple models, the multiple models may be related. For example, a particular model may be a child model (e.g., a sub-model) of a parent model, or may be a parent model of a child model. Additionally, or alternatively, a particular model may reference another model. In some implementations, a model may be stored locally by client device 210. In some implementations, a model may be stored remotely by client device 210, such as by server device 230 (e.g., in a cloud computing environment).

Server device 230 may include one or more devices capable of receiving, generating, storing, processing, and/or providing a graphical modeling environment and/or information associated with a graphical modeling environment. For example, server device 230 may include a computing device, such as a server, a desktop computer, a laptop computer, a tablet computer, or a similar type of device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different parties. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
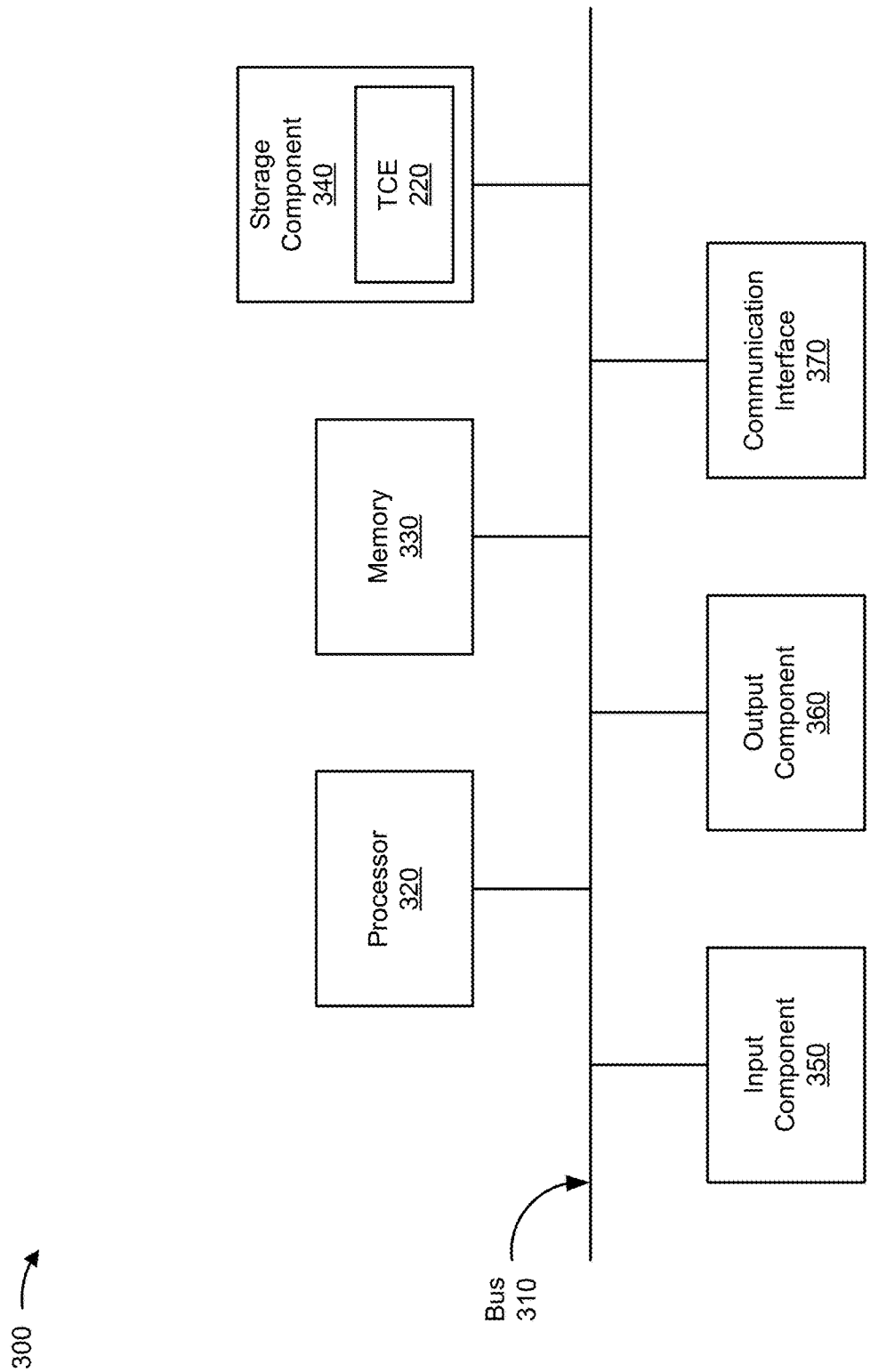
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are diagrams of an example implementation 400 of automatic renaming of elements in a graphical modeling environment. FIGS. 4A-4D merely provide an example of how an automating renaming process may be implemented by client device 210 and/or server device 220. Other implementations are described elsewhere herein.

Figure 4A:
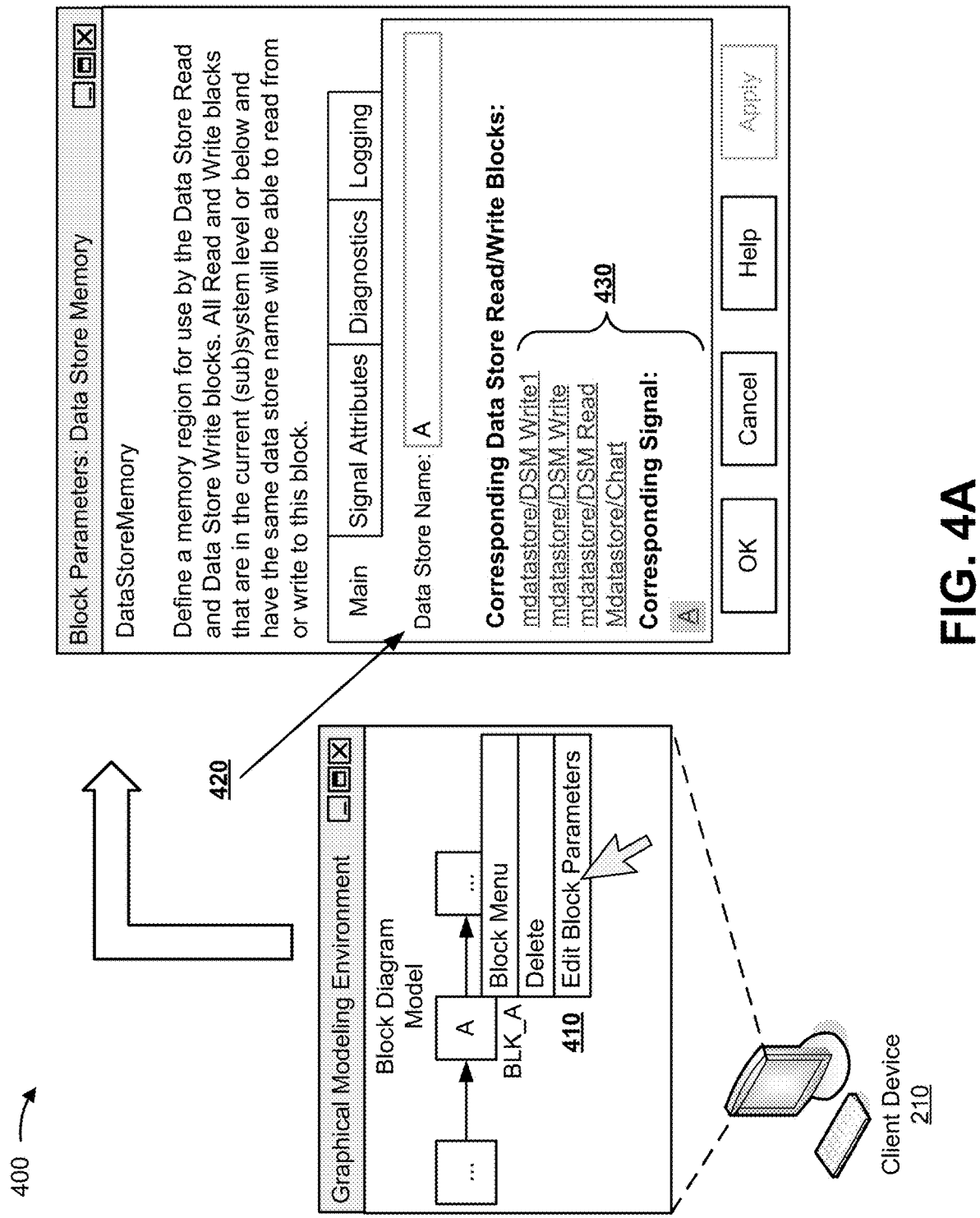
FIGS. 4A-4D are diagrams of an example implementation of automatic renaming of elements of a graphical modeling environment.

As shown in FIG. 4A, assume that a graphical modeling environment (e.g., TCE 220) is executing on client device 210. Further, assume that a user has created a block diagram model using the graphical modeling environment. As shown by reference number 410, the user interacts with an element of the block diagram model, shown as a block of the block diagram model (e.g., by right-clicking on the block), and provides input to edit block parameters associated with the block. As shown, assume that the block is named "BLK_A" as per a user-specified naming rule to name data store blocks using a prefix "BLK_" and a name of a data store that the block represents (in this case, "A"). As shown by reference number 420, the block represents a data store (e.g., one or more locations in memory), and the block parameters include a name of the data store, shown as "A." As shown by reference number 430, the block is associated with five related elements (e.g., corresponding elements), shown as four corresponding data store read/write blocks, and one corresponding signal.

Figure 4B:
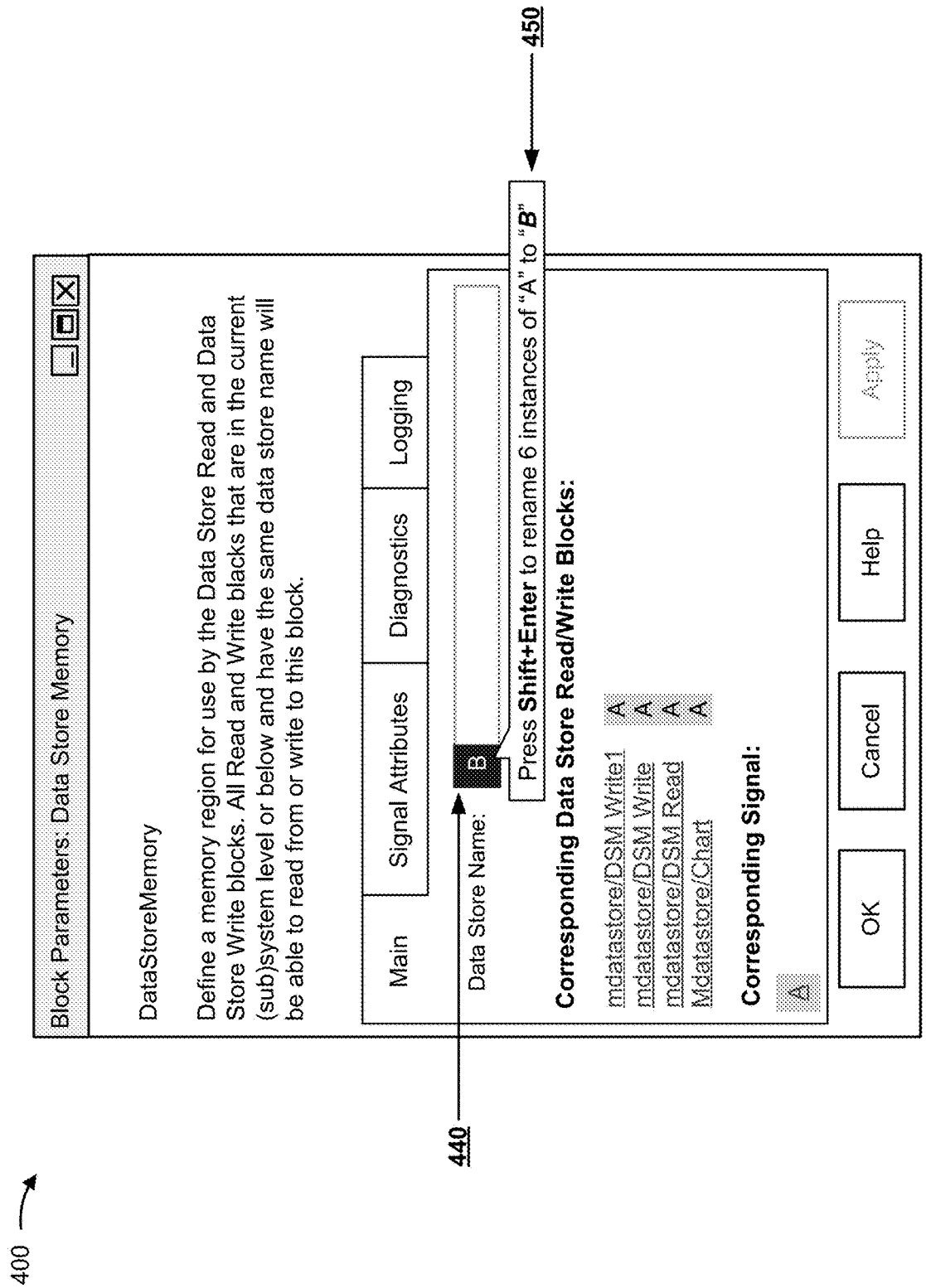

As shown in FIG. 4B, the user provides input to overwrite the old name of the data store, "A," and to identify a new name, "B," as shown by reference number 440. As shown by reference number 450, client device 210 provides a prompt that indicates that the user can rename all six elements (the data store, which is the selected element, and the five related elements) by pressing Shift+Enter on the keyboard. Assume that the user provides this input via the keyboard.

Figure 4C:
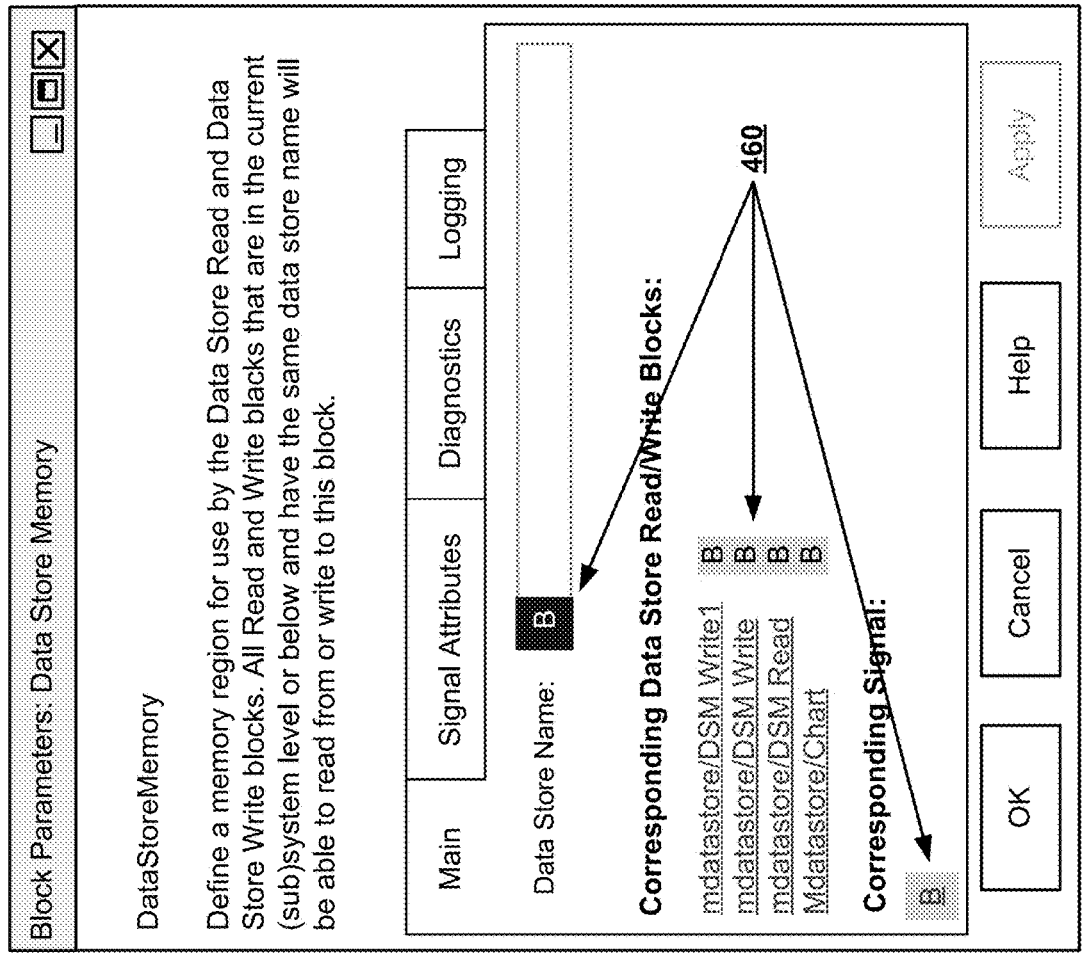
Figure 4D:
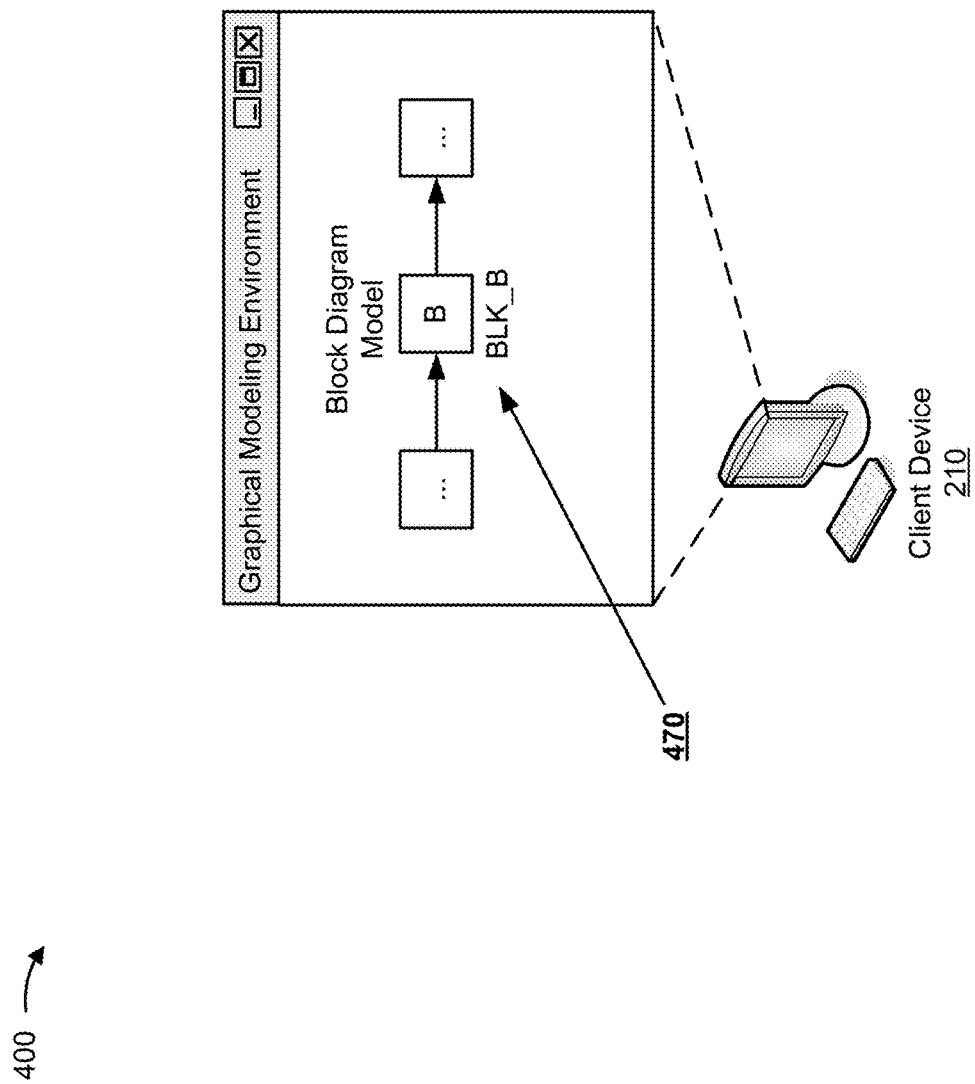

As shown in FIG. 4C, and by reference number 460, client device 210 renames all six elements based on the user input. As shown in FIG. 4D, and by reference number 470, client device 210 may also rename the block, according to the naming rule, to "BLK_B." In this way, client device 210 may automatically identify and rename related elements associated with a selected element to be renamed. This may reduce errors where a selected element is renamed with a new name, but a related element still refers to the old name.

As indicated above, FIGS. 4A-4D are provided merely as an example. Other examples are possible and may differ from what was described with regard to FIGS. 4A-4D FIGS. 5A-5D are diagrams of another example implementation 500 of automatic renaming of elements in a graphical modeling environment. FIGS. 5A-5D merely provide an example of how an automating renaming process may be implemented by client device 210 and/or server device 220. Other implementations are described elsewhere herein.

Figure 5A:
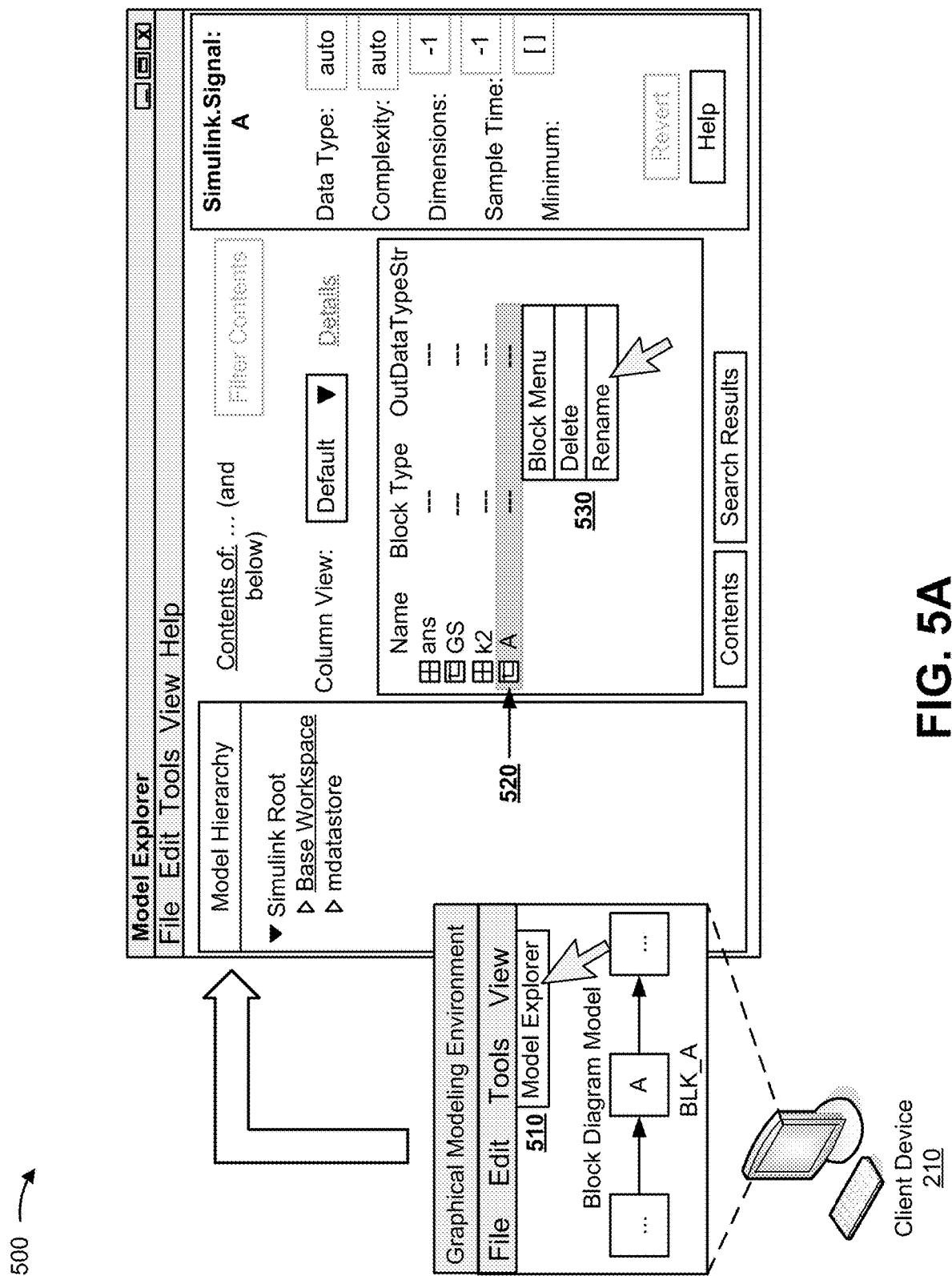

As shown in FIG. 5A, assume that a graphical modeling environment (e.g., TCE 220) is executing on client device 210. Further, assume that a user has created a block diagram model using the graphical modeling environment. As shown by reference number 510, the user interacts with the graphical modeling environment (e.g., by selecting a "Model Explorer" menu item from a "Tools" menu), and provides input to view a model explorer. The model explorer may provide information associated with the block diagram model, such as blocks included n the model, connections between blocks, model execution logic, or the like. As shown by reference number 520, the model explorer provides a representation of an element, shown as "A." As shown by reference number 530, the user provides input (e.g., via a right-click menu item, shown as "Rename") to rename selected element "A."

Figure 5B:
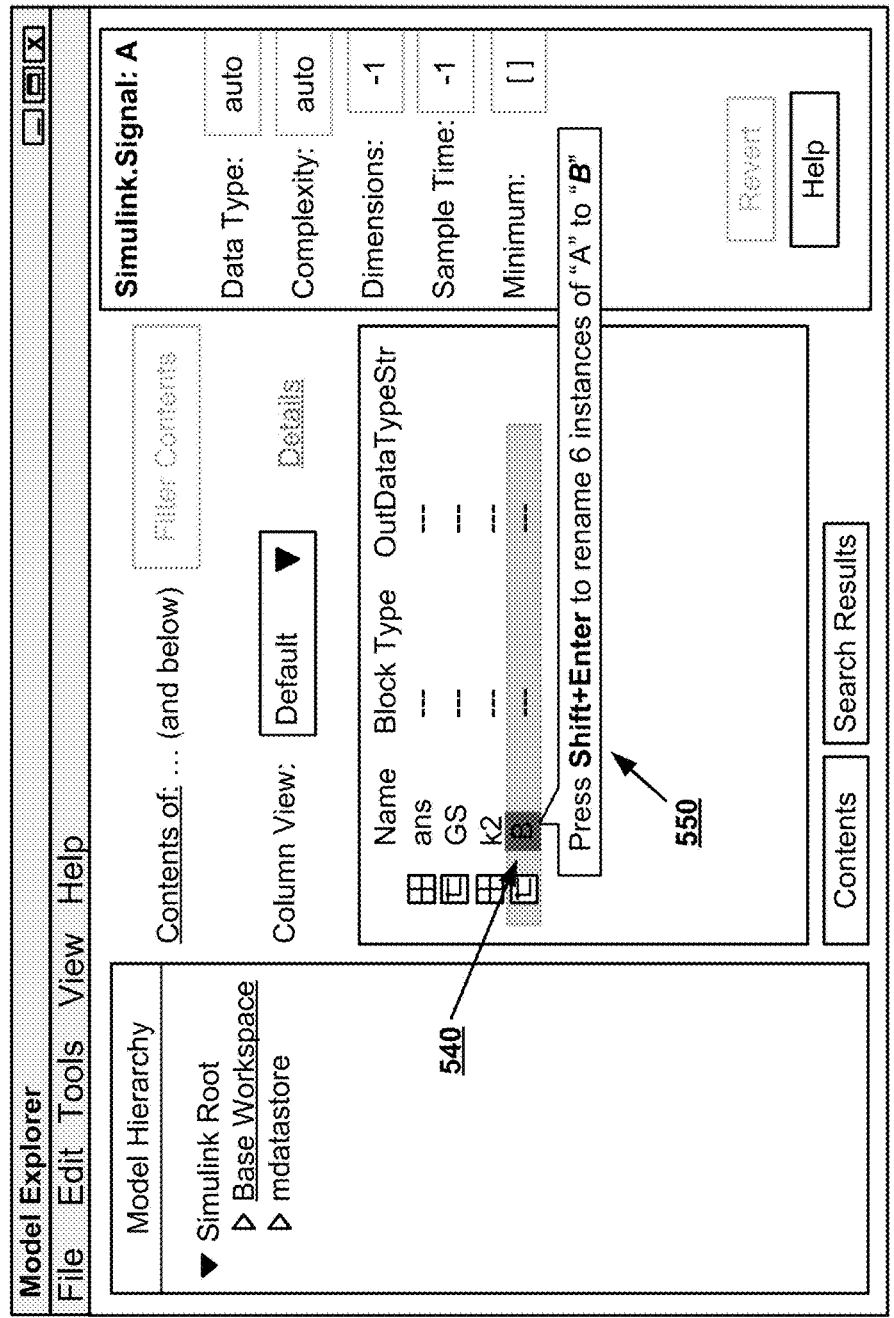

As shown in FIG. 5B, the user provides input to overwrite the old name of the selected element, "A," and to identify a new name, "B," as shown by reference number 540. As shown by reference number 550, client device 210 provides a prompt that indicates that the user can rename the selected element and all related elements by pressing Shift+Enter on the keyboard. Assume that the user provides this input via the keyboard.

As shown in FIG. 5C, assume that client device 210 uses information stored in a data structure to determine related elements associated with the renamed selected element, and to determine a renaming operation to perform to rename the related elements. For example, as shown by reference number 560, assume that client device 210 determines that the selected element is a data store, and determines to identify related elements that read data from or write data to the data store. Furthermore, assume that client device 210 determines to rename references to the data store, referenced in the related elements.

Figure 5D:
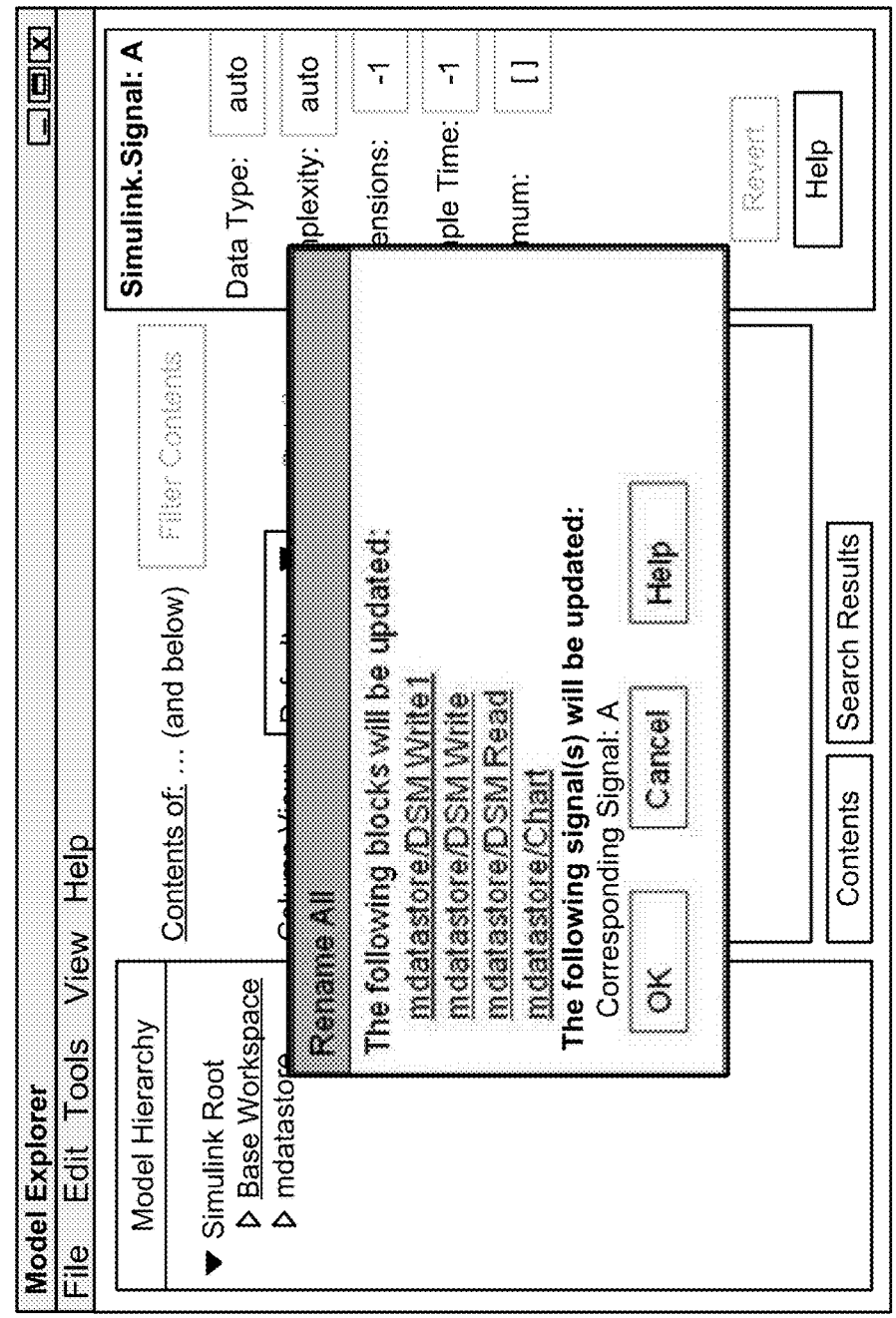

As shown in FIG. 5D, client device 210 may provide information that identifies the related elements that will be updated based on the new name (e.g., based on determining the related elements by applying a rule from the data structure). Assume that the user clicks "OK," and that client device 210 renames all six elements based on the user input (e.g., based on the renaming operation identified in the data structure). In this way, client device 210 may provide different user interfaces and/or input mechanisms for automatically identifying and renaming related elements associated with a selected element to be renamed.

As indicated above, FIGS. 5A-5D are provided merely as an example. Other examples are possible and may differ from what was described with regard to FIGS. 5A-5D.

Figure 6A:
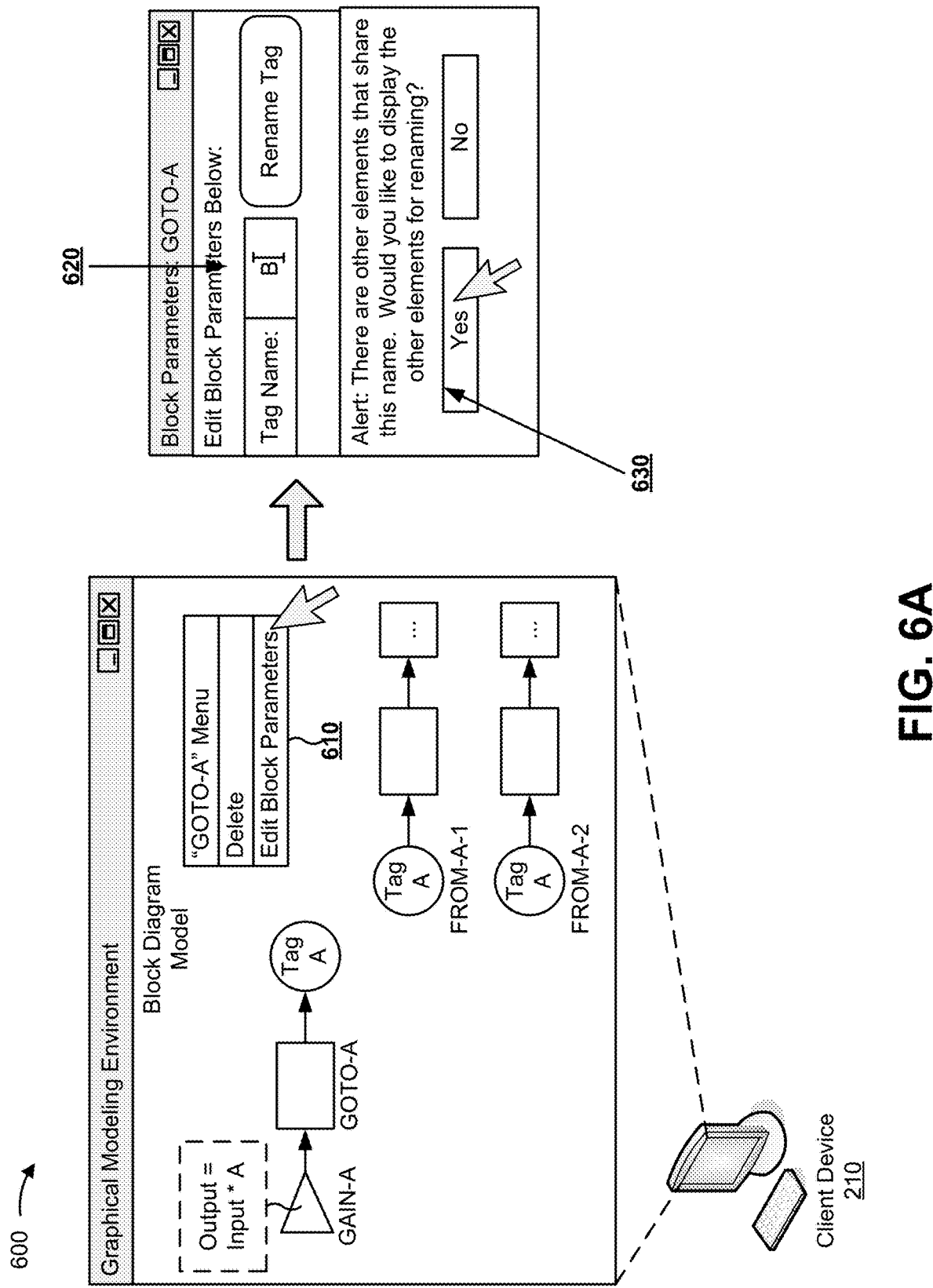
FIGS. 6A-6C are diagrams of another example implementation of automatic renaming of elements of a graphical modeling environment.
Figure 6B:
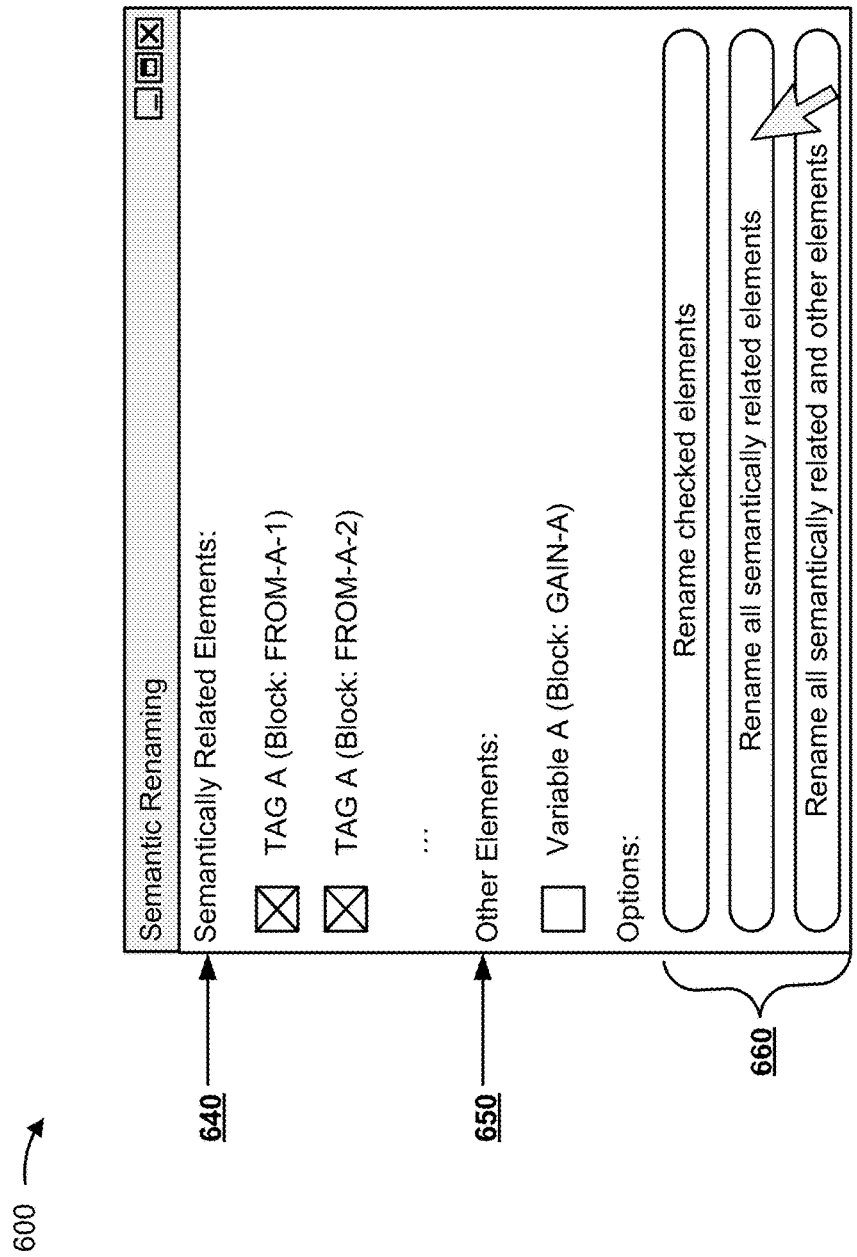
Figure 6C:
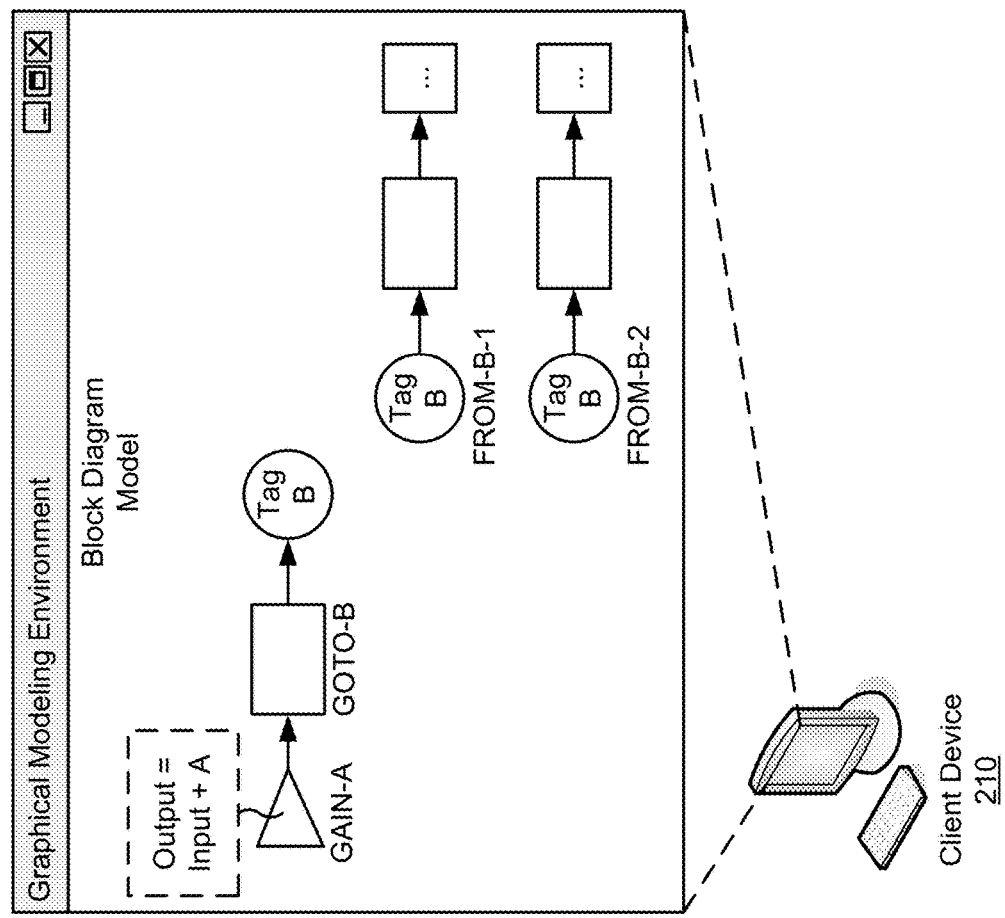

FIGS. 6A-6C are diagrams of another example implementation 600 of automatic renaming of elements in a graphical modeling environment. FIGS. 6A-6C merely provide an example of how an automating renaming process may be implemented by client device 210 and/or server device 220. Other implementations are described elsewhere herein.

As shown in FIG. 6A, assume that a graphical modeling environment (e.g., TCE 220) is executing on client device 210. Further, assume that a user has created a block diagram model using the graphical modeling environment. Assume that the block diagram model includes a gain block, shown as "GAIN-A," that uses a variable named "A" to generate an output value from an input value (e.g., Output=Input*A). Further, assume that the block diagram model includes a Goto block, shown as "GOTO-A," that provides an output to multiple From blocks, shown as "FROM-A-1" and "FROM-A-2." Assume that the Goto block and the From blocks use a tag, named "A" to indicate that the output from the Goto block is to be provided to the From blocks. As shown by reference number 610, assume that the user interacts with the graphical modeling environment to edit block parameters associated with the Goto block.

As shown by reference number 620, assume that the user provides input to rename the tag, associated with the Goto block, from "A" to "B." As shown by reference number 630, based on the user input, assume that client device 210 notifies the user (e.g., via a prompt) that there are other elements that share the name of this tag. Assume that the user interacts with client device 210 to cause client device 210 to provide, for display, information that identifies the other elements.

As shown in FIG. 6B, and by reference number 640, assume that client device 210 provides information that identifies semantically related elements. For example, because the Goto block uses the tag to provide information to the From blocks (e.g., "FROM-A-1" and "FROM-A-2"), assume that client device 210 provides information that identifies these From blocks as being semantically related (e.g., sharing the same tag name). As shown by reference number 650, assume that client device 210 also displays information that identifies other elements that are not semantically related. In this case, the variable "A," used in the gain block, does not share a semantic relationship with the tag used in the Goto block. Thus, client device 210 displays the gain block as another element (e.g., a semantically unrelated element).

As shown by reference number 660, assume that client device 210 provides the user with various renaming options. For example, client device 210 may permit the user to rename all of the checked elements (and may permit the user to check or uncheck, or select or unselect, elements displayed via the user interface), may permit the user to rename all of the semantically related elements, may permit the user to rename all of the elements that share a name (e.g., all semantically related elements and all other, semantically unrelated, elements), or the like. In example implementation 600, assume that the user provide input to rename all semantically related elements, as shown.

As shown in FIG. 6C, based on the user input, client device 210 renames the selected element (e.g., the tag associated with the Goto block), and also renamed the tags associated with the related elements (e.g., the tags associated with the From blocks) from "A" to "B." As further shown, client device 210 may also rename the Goto block and the From blocks according to a naming rule. For example, assume that the Goto block is named according to a naming rule to name Goto blocks using a prefix "GOTO-" and a name of a tag that identifies the output of the Goto block. Thus, client device 210 renames the Goto block from "GOTO-A" to "GOTO-B." As another example, assume that the From blocks are named according to a naming rule to name From blocks using a prefix "FROM-" and a postfix "-[count]," where [count] represents a count of the number of From blocks in the model. Assume that the naming rule specifies that the prefix and the postfix surrounding a name of the tag that identifies the input of the From block. In this case, client device 210 renames "FROM-A-1" to "FROM-B-1" and renames "FROM-A-2" to "FROM-B-2." In this way, client device 210 may assist with automatically renaming semantically related elements of a model in order to prevent confusion associated with named elements in the model.

As indicated above, FIGS. 6A-6C are provided merely as an example. Other examples are possible and may differ from what was described with regard to FIGS. 6A-6C.

Figure 7:
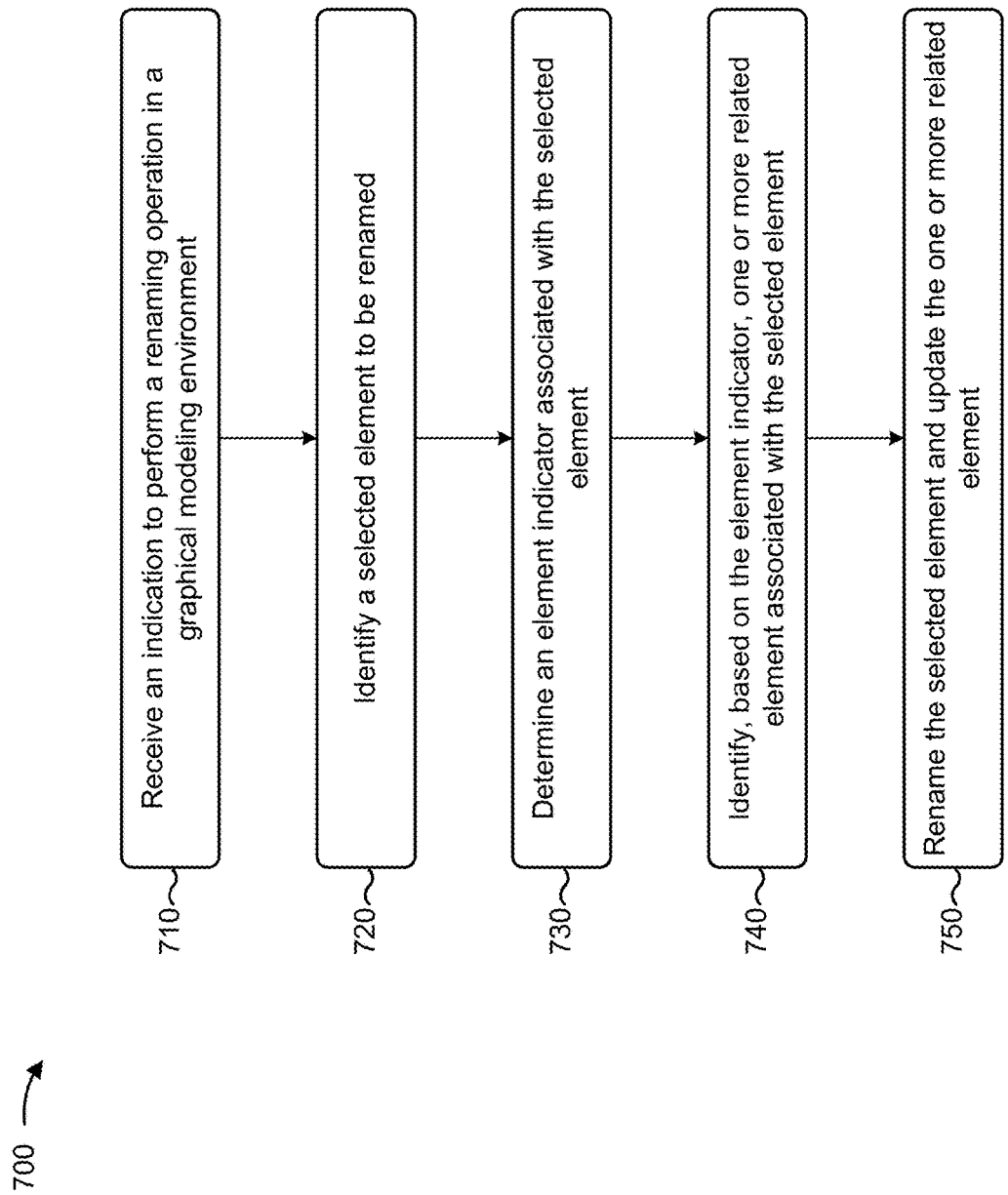
FIG. 7 is a flow chart of an example process for automatic renaming of elements of a graphical modeling environment.

FIG. 7 is a flow chart of an example process 700 for automatic renaming of elements in a graphical modeling environment. In some implementations, one or more process blocks of FIG. 7 may be performed by client device 210. In some implementations, one or more process blocks of FIG. 7 may be performed by another device or a group of devices separate from or including client device 210, such as server device 230.

As shown in FIG. 7, process 700 may include receiving an indication to perform a renaming operation in a graphical modeling environment (block 710). For example, client device 210 may receive an indication to perform a renaming operation based on user input and/or input received from another device. In some implementations, client device 210 may receive the indication based on a user interaction with a block parameter and/or a model explorer, as shown in FIGS. 4A-4D, 5A-5D, and 6A-6C. Additionally, or alternatively, the user may interact with another input mechanism (e.g., a button, a link, a text box, etc.) to provide input that causes client device 210 to perform the renaming operation. The renaming operation may include renaming a selected element (e.g., included in the graphical modeling environment) and/or updating one or more related elements, associated with the selected element, based on a new name assigned to the selected element.

In some implementations, client device 210 may provide a prompt that indicates availability of the renaming operation. For example, client device 210 may provide text for display on a user interface, such as "Select an element to rename the element." As an example, client device 210 may detect that a user has initiated renaming of an element and/or has renamed an element (e.g., by typing in a text box to input a name for the element). Based on this detection, client device 210 may prompt the user to indicate that related elements may also be renamed (e.g., as shown in FIG. 6A).

As further shown in FIG. 7, process 700 may include identifying a selected element to be renamed (block 720). For example, client device 210 may identify a selected element, included in the graphical modeling environment, to be renamed. In some implementations, a user may provide input that identifies the selected element. For example, the user may select an element to be renamed, and may provide a new name for the element.

An element may refer to, for example, an entity included in a graphical modeling environment (e.g., a graphical entity, a block in a block diagram model, a block in a state machine model, etc.), a relationship between entities (e.g., a signal passed between entities, a message passed between entities, etc.), a port associated with an entity (e.g., an input port, an output port), an attribute associated with an entity (e.g., an attribute that controls a behavior of the entity), or the like. Additionally, or alternatively, an element may refer to a data store (e.g., one or more locations in memory), a variable, a function, a model (e.g., a model of a system, a model of a sub-system, etc.), a portion of a model, or a similar type of named object. A selected element may refer to an element that a user identifies to be renamed. A related element may refer to an element that is semantically related to the selected element (e.g., that references the selected element, that shares a name with the selected element, etc., as described in more detail elsewhere herein). For example, a related element may use the name of the selected element to perform a task. In some implementations, an element may be executable (e.g., an executable entity, an executable block, etc.). Additionally, or alternatively, the renaming operation may include renaming an element identifier associated with the element.

As further shown in FIG. 7, process 700 may include determining an element indicator associated with the selected element (block 730). For example, client device 210 may determine an element indicator. The element indicator may include, for example, an element identifier, a type indicator, a scope indicator, or the like.

An element identifier may be used to identify an element (e.g., to uniquely identify the element). For example, the element identifier may include an element name, an element tag, or another type of identifier that identifies the element (e.g., the selected element). A related element may use the element identifier to reference the selected element, in some implementations.

A type indicator may indicate an element type of the selected element. As an example, the element type may indicate that the element is an entity, a relationship, a port, an attribute, or the like. Additionally, or alternatively, the element type may include, for example, a block, a particular type of block (e.g., a Goto block, a From block, etc.), a data store, a type of data store, a variable, a type of variable, a function, a type of function, a model, a type of model, a message, a type of message, or a similar type of named object.

A scope indicator may indicate a scope associated with the selected element. The scope may indicate a workspace, a portion of a model, a computer program, etc., in which the selected element is valid (e.g., where the selected element may be referenced, such as by using an element identifier). For example, a selected element may be valid within a block, within a portion of a model (e.g., a sub-system that includes multiple blocks), within the entire model, within a function, or the like. The scope indicator may indicate a hierarchical level associated with an element, in some implementations. An element (e.g., a block) may be associated with a hierarchical level in that the element itself may include one or more elements that make up the element, as described above in connection with FIG. 2.

As further shown in FIG. 7, process 700 may include identifying, based on the element indicator, one or more related elements associated with the selected element (block 740). For example, client device 210 may identify a set of related elements associated with the selected element. In some implementations, client device 210 may use the element indicator to identify the set of related elements. For example, client device 210 may use a type indicator and/or a scope indicator, associated with the selected element, to identify the set of related elements.

In some implementations, client device 210 may apply a set of rules to identify the set of related elements. The set of rules may be determined based on the element indicator (e.g., an element identifier, a type indicator, a scope indicator, etc.). For example, client device 210 may store, in a data structure, information that identifies a set of rules to be applied, for a particular type indicator and/or scope indicator, to identify related elements.

As an example, when client device 210 receives an indication to rename a selected element (e.g., an element with a name, a tag, a label, etc.), client device 210 may search information associated with other elements for a reference to the selected element (e.g., another element that uses the same name, tag, label, etc.). When client device 210 finds a particular element that references the selected element, client device 210 may identify the particular element as a related element of the selected element. In some implementations, client device 210 may identify elements at a model level (e.g., without using an intermediate representation of the model). Additionally, or alternatively, client device 210 may identify elements using an intermediate representation of the model. For example, client device 210 may generate an intermediate representation as a data structure, such as an execution order, a tree (e.g., a parse tree), a graph (e.g., an abstract syntax graph), or the like. Client device 210 may use the intermediate representation to determine semantic relationships between elements. The elements with semantic relationships may not be explicitly semantically related in a primary representation of the elements, and the intermediate representation may be used to determine the semantic relationships.

As another example, two elements may share a relationship that causes a first element to pass information to a second element (e.g., a Goto block and a From block, a publish element and a subscribe element, a send element and a receive element, etc.). For example, a Goto block in a graphical modeling environment may pass information to a From block. One or both of these blocks may be associated with a reference to the other block. When one of the blocks is renamed, client device 210 may identify the other block as a related element based on the relationship between the blocks. In some implementations, the blocks may be associated with the same tag, and client device 210 may identify the relationship based on determining that the blocks are associated with the same tag. Additionally, or alternatively, one of the blocks may be associated with an explicit reference to the other block. In this case, client device 210 may identify the relationship based on identifying the explicit reference.

Additionally, or alternatively, a selected element may be associated with a particular scope. In this case, client device 210 may identify, as a related element, another element with the same tag and the same scope. An element that has the same tag but a different scope may not be identified as a related element, in some implementations.

In some implementations, a selected element may be associated with multiple related elements. For example, a data store block may be associated with multiple elements that read data from a memory location associated with the data store (or that write information to the memory location). When a data store block is renamed, client device 210 may identify, as related elements, elements associated with the data store (e.g., elements that share a tag and/or have the same scope as the data store block). In some implementations, the related elements may be included in a different model and/or a different model domain than the data store block. In some implementations, the related elements may be associated with the same scope as the selected element. In some implementations, the related elements may be associated with different scopes than the selected element.

Additionally, or alternatively, client device 210 may determine a sample time associated with a selected element, a data type associated with the selected element, a graphical attribute associated with the selected element (e.g., a text color, a background color, a font type, etc.), or the like, and may identify related elements that share the same sample time, data type, graphical attribute, or the like.

As another example, an element may include a variable (e.g., a workspace variable). If the variable is renamed, client device 210 may search for elements, such as expressions, that refer to the old variable name, and may identify those elements as related elements. Similarly, an element may include a call to a function (e.g., a Simulink function, MATLAB function, C function). If the function is renamed, client device 210 may search for elements that refer to the old function, and may identify those elements as related elements. As described elsewhere herein, a variable or function may be identified by a name, a type indicator, and/or a scope indicator. In some implementations, a function may constitute its own scope (e.g., a function scope).

As another example, client device 210 may identify related elements based on an alias relationship. For example, assume that a model includes a variable named "A." Further, assume that a user creates an alias for the variable, named "B." If the user changes the name of the variable to "X," then client device 210 may identify the alias "B," and may rename an element identifier, associated with alias "B," to be associated with the renamed variable "X." Similarly, if the variable is named "A" and the alias is named "B," and the user renames the alias to "Y," then client device 210 may rename an element identifier, associated with the variable "A," to be associated with the renamed alias "Y."

As another example, client device 210 may identify related elements based on a rule, such as a naming rule. For example, assume that four elements represent tires of a vehicle, and are named CarTire1, CarTire2, CarTire3, and CarTire4. In this case, if the first element is renamed to TruckTire1, client device 210 may identify the other three elements as related elements based on a renaming rule represented as a regular expression (e.g., *Tire#). Client device 210 may rename, or may offer to rename, the related elements to TruckTire2, TruckTire3, and TruckTire4. The naming rule may be explicitly provided by the user (e.g., via user input) or inferred by client device 210.

As further shown in FIG. 7, process 700 may include renaming the selected element and updating the one or more related elements (block 750). For example, client device 210 may rename the selected element using a new name (e.g., input by a user). In some implementations, renaming the selected element may include modifying the element indicator. For example, client device 210 may modify the element indicator by renaming the element identifier (e.g., which may be part of the element indicator) that identifies the selected element. Additionally, or alternatively, client device 210 may update the set of related elements. In some implementations, client device 210 may update a related element by renaming the related element (e.g., using the new name for the selected element). Additionally, or alternatively, client device 210 may update a related element by updating the name of the selected element in a reference to the selected element from the related element. In other words, client device 210 may rename a corresponding element identifier, associated with the related element, that corresponds to the renamed element identifier that identifies the selected element.

In some implementations, client device 210 may implement the renaming operation based on a hierarchy of elements (e.g., at a particular hierarchical level). For example, a block may be renamed, a function within a block may be renamed without renaming the block, a variable within a function within a block may be renamed without renaming the function or the block, or the like.

Additionally, or alternatively, client device 210 may rename elements across domains and/or across different types of models (e.g., textual models, graphical models, etc.). For example, a variable in textual code may be renamed. Client device 210 may determine that the textual code corresponds to an object in a block diagram model, and may rename the object based on the renamed variable in the textual code. As another example, assume that a time-based block (e.g., in a graphical block diagram model) is renamed. Client device 210 may determine that the time-based block corresponds to an event in an event domain (e.g., in a SimEvents model), and may rename the event based on renaming the time-based block.

In some implementations, client device 210 may determine whether to perform the renaming operation (e.g., whether to rename the selected element and/or the related elements). For example, if renaming the selected element and/or the related elements would cause the model to fail to compile, to fail to execute, to provide a different output than before the renaming operation, or the like, then client device 210 may prevent the selected element and/or the related elements from being renamed. In this case, client device 210 may prompt the user regarding whether the elements are to be renamed.

In some implementations, client device 210 may test the model when performing the renaming operation (e.g., by attempting to execute the model with the renamed elements). If the testing fails, then client device 210 may undo the renaming operation. Additionally, or alternatively, client device 210 may receive user input to undo the renaming, and may undo the renaming based on the user input. In some implementations, client device 210 may permit the user to provide input to undo renaming of a selected element, of one or more related elements (e.g., one at a time), of all related elements (e.g., at the same time), of a selection of one or more elements, of a set of elements associated with a particular type and/or scope, or the like.

Additionally, or alternatively, client device 210 may check the model before finalizing renaming of a candidate element (e.g., a selected element, a related element, etc.) from an old name to a new name. In some implementations, client device 210 may determine whether there is an existing element, in the same scope as the candidate element, that has the new name. In this case, renaming the candidate element may cause a conflict, or may cause the existing element to be overwritten. When such a conflict occurs, client device 210 may prompt the user regarding the conflict, and/or may prevent the candidate element from being renamed to the new name.

As another example, client device 210 may determine whether renaming the candidate element would create a conflict by hiding an existing element, or by causing an existing element to hide the candidate element, if the candidate element were renamed. For example, the model may include an existing element with the new name. As another example, a first workspace, with a different scope (e.g., an inner scope, an outer scope, etc.) as compared to a second workspace that includes the candidate element, may include an existing element with the new name. Client device 210 may determine whether renaming the candidate element will hide the existing element. If renaming the candidate element will hide the existing element, then client device 210 may prompt the user regarding the hiding, and/or may prevent the candidate element from being renamed to the new name.

Additionally, or alternatively, client device 210 may determine whether the renaming may cause some other conflict. For example, if a renamed candidate element and an existing element would have the same name, and the model uses the new name to look up information (e.g., in different workspaces) depending on the data type or other meta information associated with an element that has the new name, then client device 210 may detect a conflict. When such a conflict occurs, client device 210 may prompt the user regarding the conflict, and/or may prevent the candidate element from being renamed to the new name.

In some implementations, client device 210 may provide information associated with the renaming. For example, client device 210 may provide, for display, information that identifies one or more elements that were renamed and/or updated. Additionally, or alternatively, client device 210 may provide information that identifies the elements to be renamed and/or updated, and may receive user input that identifies which of the elements are to be renamed and/or updated (e.g., all of the entities, one or more user-selected elements, etc.).

In some implementations, client device 210 may provide information that identifies how related elements are related to the selected element (e.g., via a semantic relationship, another relationship, etc., as shown in connection with FIG. 6B). Additionally, or alternatively, client device 210 may receive input (e.g., from a user) to rename related elements that have been identified (e.g., by user input) for renaming, to rename related elements that are semantically related to the selected element, to rename other elements that are not semantically related to the selected element, or the like (e.g., as shown in connection with FIG. 6B). Additionally, or alternatively, client device 210 may provide information that identifies related entities with a similar name (e.g., within a threshold edit distance, or Levenshtein distance).

Additionally, or alternatively, client device 210 may indicate whether an element is included in a library associated with the graphical modeling environment. In this case, client device 210 may prompt the user to indicate whether the element, stored in the library, should be renamed. Additionally, or alternatively, client device 210 may prompt the user to indicate whether the element should be renamed in the future. In this way, a user may prevent an element from being renamed using this renaming operation described herein. Client device 210 may update the element stored in the library based on user input.

In some implementations, a selected element may include a primary element, and a related element may include a dependent element that depends from the primary element. In some implementations, there may be a directed relationship from the selected element to the related element (e.g., a write to read relationship, a send to receive relationship, a publish to subscriber relationship, an output to input relationship, a function caller to callee relationship, etc.). In some implementations, the selected element may include a dependent element, and the related element may include a primary element from which the dependent element depends. In other words, client device 210 may receive information identifying a first element to be renamed (e.g., referred to elsewhere herein as a selected element), and may identify second elements (e.g., referred to elsewhere herein as related elements) related to the first element.

In some implementations, client device 210 may only rename a primary element or primary elements when the selected element is a dependent element. In some implementations, client device 210 may only rename a dependent element or dependent elements when the selected element is a primary element. In other words, client device 210 may perform the renaming operation in a particular hierarchical direction. For example, a particular element may have parent elements and child elements. If the particular element is renamed, client device 210 may only rename the parent elements, in some implementations. In some implementations, client device 210 may only rename the child elements.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Implementations described herein assist in automatic renaming of elements of a graphical modeling environment, which may increase the accuracy and the efficiency of the renaming process.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) may include, for example, code in a conventional programming language, such as C++, C, Fortran, Pascal, Python, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory to store one or more instructions; and
   one or more processors, to execute the one or more instructions, to:
   receive input to perform a renaming operation in a block diagram model of a graphical modeling environment, the block diagram model including two or more elements connected by one or more connector lines;

identify a selected element, included in the block diagram model, based on the input;

determine first element indicator associated with the selected element, the first element indicator being used to identify two or more other elements included in the block diagram model based on respective element indicators associated with the two or more other elements, at least one of the selected element or the two or more other elements comprising a block included in the block diagram model, a data store, or a block port, analyze logic, functionality, and/or scope within the block diagram model that represents a semantic relationship between the selected element and at least one of the two or more other elements, to identify at least one of the two or more other elements as being semantically related to the selected element and at least one of the two or more other elements as being semantically unrelated to the selected element;

modify the first element indicator based on receiving the input to perform the renaming operation; and modify the element indicator associated with the semantically related other element without modifying the element indicator associated with the semantically unrelated other element.

2. The device of claim 1, where the one or more processors, when modifying the first element indicator, are to:
rename an element identifier, associated with the first element indicator,
the element identifier identifying the selected element.

3. The device of claim 1, where the one or more processors, when modifying the element indicator associated with the semantically related other element, are to:
rename a corresponding element identifiers, associated with the modified element indicator,
the corresponding element identifiers being used to identify the semantically related other element.

4. The device of claim 1, where the one or more processors are further to:
provide, for display, information that identifies a set of other elements associated with the selected element,
the set of other elements including the two or more other elements;
receive a user input that identifies the two or more other elements included in the set of other elements; and
where the one or more processors, when identifying the two or more other elements, are to:
identify the two or more other elements based on the user input.

5. The device of claim 1, where the one or more processors, when modifying the element indicator associated with the semantically related other element, are to at least one of:
modify the element indicator associated with the semantically related other element based on a hierarchy associated with the two or more other elements,
determine, before modifying the one or more corresponding element indicators, whether modifying the element indicator associated with the semantically related other element causes the block diagram model to fail to compile, fail to execute, or provide an incorrect output, test the block diagram model after modifying the element indicator associated with the semantically related other element, determine, before modifying the element indicator associated with the semantically related other element, whether modifying the element indicator associated with the semantically related other element causes a conflict in the block diagram model, or provide information that identifies how the two or more other elements are associated with the selected element.

6. The device of claim 1, where the one or more processors, when receiving the input to perform the renaming operation, are to:
detect user input to rename the selected element;
provide, for display, a prompt regarding an availability of the renaming operation; and
receive the input to perform the renaming operation based on providing the prompt regarding the availability of the renaming operation.

7. The device of claim 1, where the selected element includes a data store block and at least one of the two or more other elements include one or more blocks that read from or write to the data store block.

8. The device of claim 1, where a relationship between the selected element and at least one of the two or more other elements included in the block diagram model includes at least one of:
a write to read relationship,
a send to receive relationship,
a publish to subscriber relationship,
an output to input relationship, or
a function caller to callee relationship.

9. The device of claim 1, where the semantic relationship is determined based on the first element indicator and the element indicator associated with the semantically related other element sharing a name.

10. The device of claim 1, where the logic, functionality, and/or scope is analyzed based on searching the block diagram model that comprises hierarchical levels, where the searching includes searching up at least one of the hierarchical levels or searching down at least one of the hierarchical levels, and the hierarchical levels include at least: (1) a first level associated with a first block included in the block diagram model, and (2) a second level associated with one or more blocks that are included in the first block to make up at least a portion of the first block.

11. A non-transitory computer-readable medium storing instructions, the instructions comprising:
one or more instructions that, when executed by one or more processors, cause the one or more processors to:
determine to perform a renaming operation associated with a selected element included in a block diagram model of a graphical modeling environment;
determine a first element indicator associated with the selected element,
the first element indicator being used to identify two or more other elements included in the block diagram model based on respective element indicators associated with the two or more other elements,
at least one of the selected element or the two or more other elements comprising a block included in the block diagram model, a data store, or a block port;
analyze logic, functionality, and/or scope within the block diagram model that represents a semantic relationship between the selected element and at least one of the two or more other elements, to identify at least one of the two or more other elements as being semantically related to the selected element and at least one of the two or more other elements as being semantically unrelated to the selected element;

identify a new name associated with the element indicator;

modify the first element indicator based on the new name; and modify the element indicator associated with the semantically related other element without modifying the element indicator associated with the semantically unrelated other element.

12. The non-transitory computer-readable medium of claim 11, where the one or more instructions, that cause the one or more processors to modify the element indicator associated with the semantically related other element, cause the one or more processors to:

modify a name of a corresponding element identifier, associated with the modified element indicator, that identifies the semantically related other element.

13. The non-transitory computer-readable medium of claim 11, where the first element indicator includes a type indicator that identifies a type of the selected element; and where the one or more instructions, that cause the one or more processors to identify the two or more other elements, cause the one or more processors to:

determine, based on the type indicator, a rule for identifying the two or more other elements; and identify the two or more other elements based on the rule.

14. The non-transitory computer-readable medium of claim 11, where the first element indicator includes a scope indicator that identifies a scope of the selected element; and where the one or more instructions, that cause the one or more processors to identify the two or more other elements, cause the one or more processors to:

identify the two or more other elements based on the scope indicator.

15. The non-transitory computer-readable medium of claim 14, where the scope indicator identifies at least one of:

a function associated with the selected element, a hierarchical level associated with the selected element, a sample time attribute associated with the selected element, or a graphical attribute associated with the selected element; and where the one or more instructions, that cause the one or more processors to identify the two or more other elements, cause the one or more processors to:

identify the two or more other elements based on at least one of:

the function, the hierarchical level, the sample time attribute, or the graphical attribute.

16. The non-transitory computer-readable medium of claim 11, where the one or more instructions, when executed by the one or more processors, further cause the one or more processors to:

receive input to undo a modification to the first element indicator or the element indicator associated with the semantically related other element;

determine an old name associated with the first element indicator or the element indicator associated with the semantically related other element prior to modifying the first element indicator or the element indicator associated with the semantically related other element; and modify the first element indicator or the element indicator associated with the semantically related other element, using the old name, based on receiving the input to undo the modification to the first element indicator or the element indicator associated with the semantically related other element.

17. The non-transitory computer-readable medium of claim 11, where the logic, functionality, and/or scope is analyzed based on searching the block diagram model that comprises hierarchical levels, where the searching includes searching up at least one of the hierarchical levels or searching down at least one of the hierarchical levels, and the hierarchical levels include at least: (1) a first level associated with a first block included in the block diagram model, and (2) a second level associated with one or more blocks that are included in the first block to make up at least a portion of the first block.

18. A method, comprising:

receiving input to perform a renaming operation in a block diagram model of a graphical modeling environment, the block diagram model including two or more elements connected by one or more connector lines, and the receiving the input being performed by one or more devices;

identifying a selected element included in the block diagram model based on the input, the identifying the selected element being performed by the one or more devices;

determining a first element indicator associated with the selected element, the first element indicator being used to identify two or more other elements included in the block diagram model based on respective element indicators associated with the two or more other elements, at least one of the selected element or the two or more other elements comprising a block included in the block diagram model, a data store, or a block port, and the determining the element indicator being performed by the one or more devices;

analyzing logic, functionality, and/or scope within the block diagram model that represents a semantic relationship between the selected element and at least one of the two or more other elements, to identify at least one of the two or more other elements as being semantically related to the selected element and at least one of the two or more other elements as being semantically unrelated to the selected element, the identifying being performed by the one or more devices;

modifying the first element indicator based on receiving the input to perform the renaming operation, the modifying the first element indicator being performed by the one or more devices; and modifying the element indicator associated with the semantically related other element without modifying the element indicator associated with the semantically unrelated other element, the modifying the element indicator associated with the semantically related other element being performed by the one or more devices.

19. The method of claim 18, where modifying the first element indicator comprises:

updating an element identifier, associated with the first
element indicator, that identifies the selected element;
and
where modifying the element indicator associated with
the semantically related other element comprises:
updating a corresponding element identifier, associated
with the modified element indicator, that identifies
the semantically related other element.

20. The method of claim 18, where modifying the first element indicator or modifying the element indicator associated with the semantically related other element comprises:
determining whether renaming the first element indicator
or renaming the element indicator associated with the
semantically related other element would create a conflict with a particular element in the block diagram
model,
the conflict including the renaming the first element
indicator or the renaming the element indicator associated with the semantically related other element
causing at least one of:
the block diagram model to fail to compile,
the block diagram model to fail to execute, or
a different output to be provided from the block
diagram model than before the renaming the first
element indicator or the renaming the element
indicator associated with the semantically related
other element; and
renaming the first element indicator or renaming the
element indicator associated with the semantically
related other element based on determining whether
renaming the first element indicator or renaming the
element indicator associated with the semantically
related other element would create the conflict.

21. The method of claim 20, further comprising:
providing, for display, information regarding the conflict;
receiving user input that identifies whether to rename the
first element indicator or the element indicator associated with the semantically related other element; and
where renaming the first element indicator or renaming
the element indicator associated with the semantically
related other element comprises
renaming the first element indicator or renaming the
element indicator associated with the semantically
related other element based on the user input that
identifies whether to modify the first element indicator or the element indicator associated with the
semantically related other element.

22. The method of claim 18, further comprising:
determining a directed relationship between the selected
element and the two or more other elements; and
where modifying the first element indicator or modifying
the element indicator associated with the semantically
related other element comprises
modifying the first element indicator or modifying the
element indicator associated with the semantically
related other element based on the directed relationship.

23. The method of claim 18, further comprising:
storing the selected element or the two or more other
elements in a library;
receiving an indication to prevent the renaming operation
from being performed on the selected element or at
least one of the two or more other elements;
storing the indication to prevent the renaming operation
from being performed on the selected element or at
least one of the two or more other elements; and
where modifying the first element indicator or modifying
the element indicator associated with the semantically
related other element comprises
modifying the first element indicator or modifying the
element indicator associated with the semantically
related other element based on the indication to
prevent the renaming operation from being performed on the selected element or at least one of the
two or more other elements.

24. The method of claim 18, further comprising:
determining a naming rule for renaming the selected
element or at least one of the two or more other
elements based on the first element indicator; and
renaming the selected element or at least one of the two
or more other elements, using the first element indicator, based on the naming rule.

25. The method of claim 18, where the logic, functionality, and/or scope is analyzed based on searching the block diagram model that comprises hierarchical levels, where the searching includes searching up at least one of the hierarchical levels or searching down at least one of the hierarchical levels, and the hierarchical levels include at least: (1) a first level associated with a first block included in the block diagram model, and (2) a second level associated with one or more blocks that are included in the first block to make up at least a portion of the first block.

* * * * *